US007452632B2

(12) United States Patent
Lee et al.

(10) Patent No.: US 7,452,632 B2
(45) Date of Patent: Nov. 18, 2008

(54) NEGATIVE ACTIVE MATERIAL FOR RECHARGEABLE LITHIUM BATTERY, METHOD OF PREPARING SAME, AND RECHARGEABLE LITHIUM BATTERY COMPRISING SAME

(75) Inventors: Sang-Min Lee, Kyungki-do (KR); Sung-Soo Kim, Seoul (KR); Kyou-Yoon Sheem, Kyungki-do (KR); Sang-Jin Kim, Kyungki-do (KR); Joon-Sup Kim, Kyungki-do (KR); Seong-Mo Oh, Seoul (KR)

(73) Assignee: Samsung SDI Co., Ltd., Suwon-si (KR)

( * ) Notice: Subject to any disclaimer, the term of this patent is extended or adjusted under 35 U.S.C. 154(b) by 712 days.

(21) Appl. No.: 10/848,168

(22) Filed: May 19, 2004

(65) Prior Publication Data

US 2004/0234859 A1 Nov. 25, 2004

(30) Foreign Application Priority Data

May 21, 2003 (KR) ...................... 10-2003-0032259

(51) Int. Cl.
*H01M 4/58* (2006.01)
(52) U.S. Cl. .................... 429/231.8; 429/219; 429/220; 429/221; 429/222; 429/223; 429/229; 429/231.5; 429/218.1; 252/182.1
(58) Field of Classification Search .............. 429/231.8, 429/219, 220, 221, 222, 223, 229, 231.5, 429/218.1; 252/182.1

See application file for complete search history.

(56) References Cited

U.S. PATENT DOCUMENTS

| 6,300,013 | B1 | 10/2001 | Yamada et al. | |
| 6,524,749 | B1* | 2/2003 | Kaneda et al. | 429/231.8 |
| 6,589,696 | B2 | 7/2003 | Matsubara et al. | |
| 6,949,312 | B1* | 9/2005 | Kawakami et al. | 429/218.1 |
| 7,147,970 | B2* | 12/2006 | Ishikawa et al. | 429/231.8 |
| 2003/0118908 | A1 | 6/2003 | Ishikawa et al. | |

FOREIGN PATENT DOCUMENTS

| CN | 1272698 | 11/2000 |
| CN | 1335651 | 2/2002 |
| JP | 11-260369 | * 9/1999 |
| JP | 11-329436 | 11/1999 |
| JP | 11-343109 | 12/1999 |
| JP | 2000-238824 | 9/2000 |
| JP | 2000-306582 | 11/2000 |
| KR | 2002-93062 | 12/2002 |

* cited by examiner

*Primary Examiner*—Laura S Weiner
(74) *Attorney, Agent, or Firm*—Stein, McEwen & Bui, LLP

(57) ABSTRACT

A negative active material for a rechargeable lithium battery, a method for making the negative active material, and a rechargeable lithium battery including a carbonaceous material, which is capable of reversibly intercalating and deintercalating lithium, and particles of a metal or a metal compound or mixtures thereof, distributed in the carbonaceous material, the metal or the metal compound being capable of forming an alloy with lithium during electrochemical charging and discharging.

33 Claims, 2 Drawing Sheets

NEGATIVE ACTIVE MATERIAL FOR RECHARGEABLE LITHIUM BATTERY, METHOD OF PREPARING SAME, AND RECHARGEABLE LITHIUM BATTERY COMPRISING SAME

CROSS-REFERENCE TO RELATED APPLICATIONS

This application claims the benefit of Korean Patent Application No. 2003-32259 filed on May 21, 2003, in the Korean Industrial Property Office, the disclosure of which is incorporated herein by reference.

BACKGROUND OF THE INVENTION

1. Field of the Invention

The present invention relates to a negative active material for a rechargeable lithium battery, a method of preparing the same, and a rechargeable lithium battery comprising the same. More particularly, the present invention relates to a negative active material for a rechargeable lithium battery exhibiting good initial efficiency and reversible efficiency, a method of preparing the same, and a rechargeable lithium battery comprising the same.

2. Description of the Related Art

Currently, commercially available rechargeable lithium batteries exhibit higher power and energy density than the conventional nickel-cadmium battery or nickel hydrogen battery, and substantially generate 4V, i.e., they have an average discharge potential of 3.7V. Such a battery is considered an essential element in the digital generation since it is an indispensable energy source for portable digital devices such as a mobile telephone, a notebook computer, a camcorder and so on, which are abbreviated as 3C devices.

Attempts have been made to use lithium metal, as a negative active material, for the rechargeable lithium battery because of its high energy density. However, lithium metal causes a serious problem of dendrite formation on the surface of the lithium metal during charging and discharging. This may cause a short circuit and increase the reactivity of the lithium metal so that the lithium metal reacts with an electrolyte, to form a polymer film without ionic conductivity on the surface of the lithium metal. As a result, the battery resistance increases abruptly, preventing smooth charging and discharging.

Such a problem may be addressed by replacing lithium metal with carbonaceous materials that are capable of intercalating and detintercalating lithium ions. Carbonaceous materials have no shortcomings associated with dendrites. However, the carbonaceous materials, especially graphite, have smaller theoretical capacities, such as 372 mAh/g, which is only 10% of the theoretical capacity of lithium metal.

Recently, various attempts have been made to increase theoretical capacities. One such attempt includes the use of metals or non-metals that form a compound together with lithium. For example, tin (Sn) intercalates lithium to form a $Li_{22}Sn_5$ compound from which lithium is not extracted, thereby causing no formation of dendrites. Thus, when a tin-included compound is electrochemical reversibly applied to a negative active material, it is expected that a theoretical capacity of 993 mAh/g may be obtained, which is significantly higher than that of the theoretical capacity of graphite.

However, metal compounds, such as the above-mentioned tin-included compound have several disadvantages. These disadvantages include poor electrochemical reversibility, poor charge and discharge efficiencies, and rapid capacity fading during charging and discharging. One of the possible causes of these disadvantages includes low electrical conductivity of the metal compounds, which in turn is caused by the formation of an oxidation layer thereon during the preparation of these metal compounds. Electrical conductivity also depends on the type of metal used.

In addition, these disadvantages may be caused by the formation of a Li-metal intermetallic compound during electrochemical charging and discharging that causes extreme expansion and contraction of the crystalline matrix volume, which in turn leads to cracks and to minute particle generation of the metal compound, thereby facilitating formation of a solid electrolyte interface layer. Such miniscule material forms spaces in the metal compound, causing a reduction in reversible discharge efficiency and discharge capacity. Therefore, there is a need to provide a negative active material for a rechargeable lithium battery that exhibits high capacity, improved discharge reversible efficiency, and capacity retention.

SUMMARY OF THE INVENTION

Accordingly, is an aspect of the present invention to provide a negative active material for a rechargeable lithium battery exhibiting high capacity, improved discharge reversible efficiency, and capacity retention.

Another aspect of the present invention is to provide a method of preparing the negative active material for a rechargeable lithium battery.

It is still another aspect of the present invention to provide a rechargeable lithium battery including the negative active material.

Additional aspects and/or advantages of the invention will be set forth in part in the description which follows and, in part, will be obvious from the description, or may be learned by practice of the invention.

These and/or other aspects of the present invention may be achieved by a negative active material for a rechargeable lithium battery including a carbonaceous material, which is capable of reversibly intercalating and deintercalating lithium; and particles of a metal or a metal compound or mixtures thereof distributed in the carbonaceous material, the metal or the metal compound being capable of making an alloy with lithium during electrochemical charging and discharging.

In order to achieve these and/or other aspects, the present invention provides a method of preparing the negative active material including mixing particles of a metal or a metal compound or mixtures thereof with a solution of a carbon precursor to prepare a first mixture, drying the first mixture, mixing the dried first mixture with a metal oxide to prepare a second mixture, heat-treating the second mixture, and treating the heat-treated mixture with a solution of acid.

The present invention further includes a rechargeable lithium battery including a negative electrode including the negative active material; a positive electrode including a positive active material which is capable of reversibly intercalating and deintercalating lithium and an electrolyte including a non-aqueous organic solvent and a lithium salt.

BRIEF DESCRIPTION OF THE DRAWINGS

These and/or other aspects and advantages of the present invention will become apparent and more readily appreciated from the following description of the embodiments, taken in conjunction with the accompanying drawings of which.

DETAILED DESCRIPTION OF THE PREFERRED EMBODIMENTS

Figure 1:
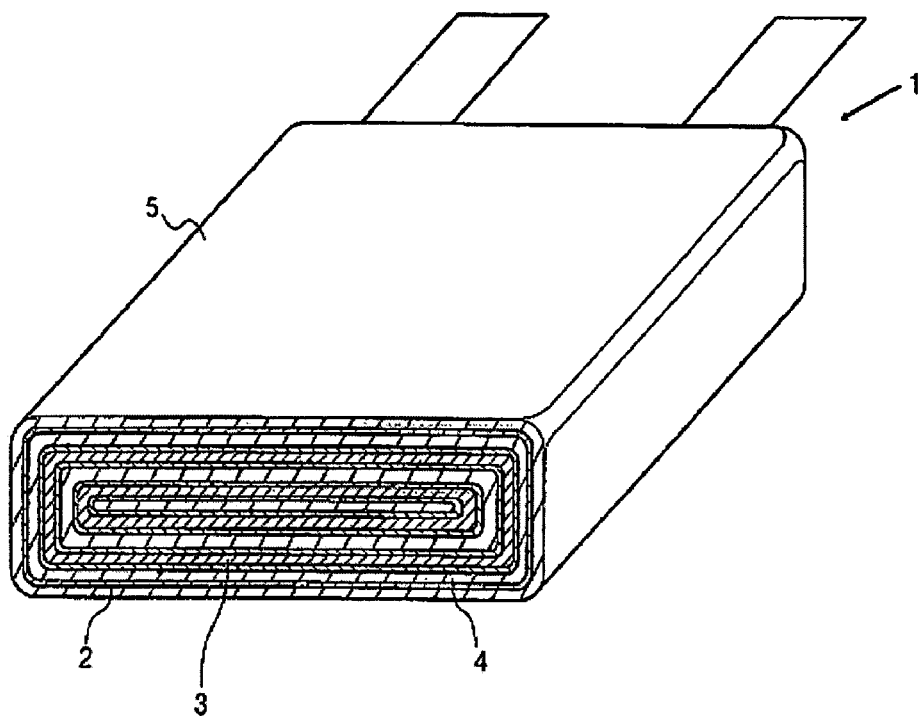
FIG. 1 is a cross-sectional view showing a rechargeable lithium battery of the present invention.
Figure 2:
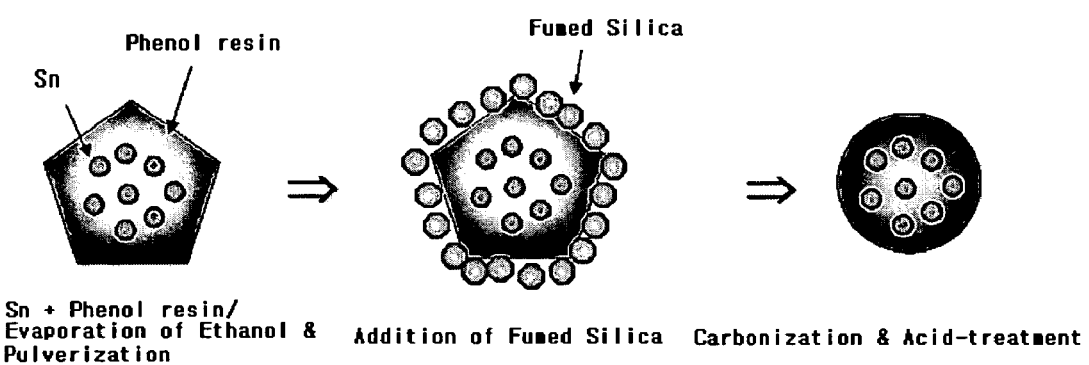
FIG. 2 is a diagram showing a process of preparing a negative active material for a rechargeable lithium battery of the present invention.

Reference will now be made in detail to the embodiments of the present invention, examples of which are illustrated in the accompanying drawings, wherein like reference numerals refer to the like elements throughout. The embodiments are described below in order to explain the present invention by referring to the figures.

The present invention relates to a negative active material for a rechargeable lithium battery, including a metal or a metal compound or mixtures thereof, which exhibits high capacity.

A metal or a metal compound or mixtures thereof are difficult to use as a negative active material because of shortcomings associated with extreme expansion and contraction of the volume of a lithium metal compound generated during electrochemical reaction, even though the metal or the metal compound may have a high capacity. In the present invention, such shortcomings may be addressed by using a carbonaceous material as a mechanical and an electrical matrix.

The negative active material of the present invention includes a carbonaceous material, which is capable of reversibly intercalating and deintercalating lithium, and particles of a metal or a metal compound or mixtures thereof. The metal or the metal compound is one which electrochemically reacts with lithium to form a compound. The metal or the metal compound is generally represented by formula 1, where more preferred are metal compounds that are oxides of Sn, Si, or Sb:

$$A_{1-x}B_x \qquad (1)$$

where $0 \leqq x \leqq 0.9$, and more preferably $0 \leqq x \leqq 0.5$;

A is lithium-intercalating metal, and is at least one metal selected from Sn, Si, Ag, Zn, Cd, Al, Ga, In, Ce, Pb, AS, Bi, or Sb; and B supports A, and is at least one metal selected from Zr, Ti, Fe, Co, Ni, Cu, C, O, N, and S.

The metal or the metal compound may have an amorphous or crystalline structure, preferably having an average particulate diameter of 20 to 500 nm, and more preferably 20 to 80 nm. If the average particulate diameter is less than 20 nm, coagulation of the metal or the metal compound particles occurs, making it difficult to work with. If the average particulate diameter is more than 500 nm, the metal or the metal compound forms very minuscule particles so that the carbonaceous matrix cannot be controlled.

The metal or the metal compound or a mixture thereof is preferably present in the amount of 10 to 80 wt % in the negative active material of the present invention. If the amount of the metal or the metal compound or a mixture thereof is less than 10 wt %, the increase in energy density cannot be substantially achieved. If the amount is more than 80 wt %, the amount of the carbonaceous material matrix is relatively reduced such that it acts insufficiently as a conductive material and buffer to control lattice volume expansion during charging and discharging, thus decreasing the cycle life characteristics.

The negative active material preferably has an average particulate diameter of 10 to 100 μm, and more preferably, an average particulate diameter of 20 to 50 μm. An average particulate diameter of less than 10 μm causes a decrease in initial efficiency, and that of more than 100 μm makes electrode preparation difficult.

The negative active material preferably has a ratio "R" of 20 or less, where "R" is the ratio of the particle diameter of the metal or the metal compound to the average diameter of the negative active material.

The negative active material may have an oxide layer which is inherently produced on its surface during the negative active material preparation. A thin oxide layer has an affect on ionic conductivity, so the oxide layer may be controlled to a thickness of 10 Å. A thickness of more than 10 Å may prevent electric conductivity between the metals or the metal compounds.

The carbonaceous materials that can be used in the present invention include a material which is capable of reversibly intercalating and deintercalating lithium ions, such as amorphous carbon or crystalline carbon. More preferred is amorphous carbon. Examples of the amorphous carbon are soft carbon, hard carbon, a mesophase pitch carbide, or sintering cokes. Examples of the crystalline carbon are nonshapeless, plate-type, flake-type, globular, or fibrous natural or artificial graphite.

The negative active material of the present invention has a globular or elliptical shape.

The negative active material of the present invention has a modified surface structure because of an acid treatment. That is, the structure of the surface is different from that of the core because of the acid treatment, and the intensity ratio of the Raman spectrum of the shell is larger than that of the core.

The shell has a Raman Spectroscopy intensity ratio Ra I(1360))/I(1580) of 0.2 to 1.5.

After the negative active material of the present invention has been charged and discharged, the carbonaceous material and the metal included in the active material may be converted into a metal compound such as Li-included compound, oxides, nitrides, or fluorides. Furthermore, the added metal or the metal compound may be present on a surface of the active material or the negative electrode, in the form of mass or agglomerated particles.

A negative active material preparation of the present invention will be illustrated in more detail.

A metal or a metal compound or a mixture thereof in a particle form is mixed with a solution of a carbon precursor. The metal or the metal compound in the particle form may be commercially purchased, or it may be prepared by a liquid-reduction process with a metal precursor, a vacuum induction melting process, a melt-spinning process, a roll-quenching process, a gas-atomizing process, or an arc-melting process under a gas atmosphere (inert gas, oxygen gas, or nitrogen gas) with a mixture of the pure metal.

The liquid-reduction process is widely used because of it's simplicity. The metal precursor is dissolved in a solvent to prepare a solution of the metal precursor, and the solution of the metal precursor is shaken with a solution of a reductant at approximately 400 to 600° C., followed by the addition of n-hexane.

The precursor may be a metal salt of a water-soluble fatty acid such as formic acid, acetic acid, or propionic acid, or chlorides such as $SnCl_2$. The solvent may be, but is not limited to, water. The solution of the reductant may be obtained from a reductant such as NaBH₄ or NaOH in water. At this time, cethyltrimethyl ammonium (CATB) or sodium citrate dihydrate may be further used.

Particles of the metal or the metal compound of nanometer size or with a nanometer-sized crystalline structure are obtained. The particles have an average diameter of 20 to 500 nm.

The particles of the metal or the metal compound or mixtures thereof are mixed with a solution of a carbon precursor, to form a mixture, that is prepared by dissolving the carbon precursor in alcohol. The alcohol may be ethanol, methanol, or isopropyl alcohol.

The carbon precursor is an organic material which is decomposed into carbon by heat-treating, and may be a pitch or thermosetting resin. The pitch may be a soft pitch such as coal tar pitch or a hard pitch such as coal tar pitch. The thermosetting resin may be resol-type or novolac-type phenolic resin or furan resin.

The mixture is dried and pulverized to prepare a mixture of the particles of metal or the metal compound with the carbon precursor. The mixture is mixed with a metal oxide in the weight ratio of 70 to 80 wt % and 20 to 30 wt %. The metal oxide may be at least one of selected from $SiO_2$ (in particular, fumed silica), $Al_2O_3$, MgO, $Y_2O_3$, CaO, $Co_3O_4$, $TiO_2$, $ZrO_2$, $SnO_2$, SnO or $Fe_2O_3$. The metal oxide facilitates a change of a spherical shape or elliptical shape of the carbon precursor to various other shapes at a glass transition temperature or more, to prevent coagulation of the carbon precursor. That is, the metal oxide helps to obtain a rounded negative active material.

The resulting mixture is heat-treated. The heat-treatment is preferably performed at 500 to 2000° C., and more preferably 700 to 1500° C. If the heat-treatment is performed at a temperature of less than 500° C., components in addition to carbon remain, from the metal and the metal compound, thereby deteriorating performances of the active material. If the heat-treatment is performed at a temperature of more than 2000° C., evaporation of the metal or the metal compound occurs, or coagulation of the metal or the metal compound occurs.

In addition, metal oxide on a surface of the resulting material may decrease electrical conductivity, so the resulting material is treated with a solution of acid to remove the metal oxide from the surface, thereby obtaining a negative active material. The solution of acid may be an aqueous solution of HF, HCl, or $H_2SO_4$. The concentration of the acid solution is not a critical factor, and may be suitably controlled. By treating with acid, the structure of the surface becomes different from the center portion, and the negative active material develops a core-shell structure, in which a Raman Spectroscopy intensity ratio of the core is different from that of the shell.

One embodiment of a rechargeable lithium battery with the negative active material of the present invention is shown in FIG. 1. The rechargeable lithium battery 1 includes a battery case 5 including a positive electrode 3, a negative electrode 4, and a separator 2 interposed between the positive electrode 3 and the negative electrode 4. An electrolyte is present between the positive electrode 3 and the negative electrode 4.

The positive electrode includes a positive active material which is capable of reversibly intercalating and deintercalating lithium ions. Examples of positive active materials include compounds represented by formulas 2 to 13.

$$Li_xMn_{1-y}M_yA_2 \tag{2}$$

$$Li_xMn_{1-y}M_yO_{2-z}X_z \tag{3}$$

$$Li_xMn_2O_{4-z}X_z \tag{4}$$

$$Li_xCo_{1-y}M_yA_2 \tag{5}$$

$$Li_xCo_{1-y}M_yO_{2-z}X_z \tag{6}$$

$$Li_xNi_{1-y}M_yA_2 \tag{7}$$

$$Li_xNi_{1-y}M_yO_{2-z}X_z \tag{8}$$

$$Li_xNi_{1-y}Co_yO_{2-z}X_z \tag{9}$$

$$Li_xNi_{1-y-z}Co_yM_zA_\alpha \tag{10}$$

$$Li_xNi_{1-y-z}Co_yM_zO_{2-\alpha}X_\alpha \tag{11}$$

$$Li_xNi_{1-y-z}Mn_yM_zA_\alpha \tag{12}$$

$$Li_xNi_{1-y-z}Mn_yM_zO_{2-\alpha}X_\alpha \tag{13}$$

(where $0.90 \leq x \leq 1.1$; $0 \leq y \leq 0.5$; $0 \leq z \leq 0.5$; $0 \leq \alpha \leq 2$;
M is at least one selected from Al, Ni, Co, Mn, Cr, Fe, Mg, Sr, V or rare earth elements; and
A is selected from O, F, S, or P; and X is F, S, or P.)

The electrolyte includes a non-aqueous organic solvent and a lithium salt. The non-aqueous organic solvent acts as a medium, which can transport ions that participated in the electrochemical reactions. The non-aqueous organic solvent includes at least one carbonate, ester, ether or ketone. The carbonates may be a cyclic carbonates or chain carbonates. If a mixture of one or more is used, the mixing ratio may be suitably controlled according to the desired battery performances, as is well understood in the related art. The cyclic carbonate may be ethylene carbonate, propylene carbonate, or a mixture thereof. The chain carbonate may be dimethyl carbonate, diethyl carbonate, ethylmethyl carbonate, or methylpropyl carbonate. The ester may be γ-butyrolactone, valerolactone, decanolide, or mevarolactone.

The ketone may be polymethylvinyl ketone.

The lithium salt acts as a source for supplying lithium ions in the battery, and helps the working of the battery. In addition, the lithium salt activates transfer of lithium ions between the positive electrode and the negative electrode. The lithium salt may be at least one selected from $LiPF_6$, $LiBF_4$, $LiSbF_6$, $LiAsF_6$, $LiCF_3SO_3$, or $LiN(CF_3SO_2)_3$, $Li(CF_3SO_2)_2N$, $LiC_4F_9SO_3$, $LiClO_4$, $LiAlO_4$, $LiAlCl_4$, $LiN(C_xF_{2x+1}SO_2)(C_yF_{2y+1}SO_2)$ (where x and y are natural numbers), LiCl or LiI.

The concentration of the lithium salt should preferably be in the range of 0.6 to 2.0M. If the concentration of the lithium salt is less than 0.6M, the conductivity of the electrolyte decreases, thereby deteriorating battery performance. If the concentration of the lithium salt is more than 2.0M, the viscosity of the electrolyte increases, thereby deteriorating movement of lithium ions.

Hereinafter, the present invention will be explained in detail with reference to examples. These examples, however, should not in any sense be interpreted as limiting the scope of the present invention.

EXAMPLE 1

A $SnCl_2$ metal precursor, cetyltrimethyl ammonium bromide and sodium citrate dihydrate were dissolved in water to prepare a solution of the metal precursor. An NaBH₄ reductant was dissolved in water to prepare a solution of the reductant. The metal precursor solution was mixed with the reductant solution at approximately 400° C. while shaking it, and n-hexane was added thereto and it was further shaken, yielding Sn particles with a nanometer particulate size (<50 nm).

A phenol resin carbon precursor was dissolved in methanol to prepare a solution of the carbon precursor. The carbon precursor solution was mixed with the Sn particles to be in the final weight ratio of 85:15 after heat-treatment and dried followed by pulverizing, yielding a mixed powder. 70 wt % of the mixed powder was mixed with 30 wt % of a fumed silica powder, and the resulting mixture was heat-treated at 1000° C. under a nitrogen atmosphere. The heat-treated material was immersed in an aqueous solution of 48% HF and shaken for 24 hours to remove the silica powder. As a result, a negative active material for a rechargeable lithium battery was prepared.

90 wt % of the negative active material and 10 wt % of a polytetrafluoroethylene binder were mixed in an N-methylpyrrolidone solvent to prepare a negative active material slurry. The amount of the binder was 2 wt % based on the weight of the negative active material.

The negative active material slurry was coated on a Cu current collector with a thickness 10 μm by a doctor-blade procedure and dried at 100° C. for 24 hours under a vacuum to evaporate the N-methylpyrrolidone solvent. The dried collector was cut to a circle with a diameter of 16 mm to produce a coin-type negative electrode with an 80 μm thick negative active material layer.

EXAMPLE 2

A negative active material was prepared by the same procedure as in Example 1, except that an Sn powder with an average particulate diameter of 10 μm (ALDRICH CO., LTD was used.

COMPARATIVE EXAMPLE 1

A negative active material was prepared by the same procedure as in Example 1, except that artificial graphite with an average particulate diameter of 20 μm was used instead of the carbon precursor.

COMPARATIVE EXAMPLE 2

A negative active material slurry was prepared by the same procedure as in Example 1, except that the Sn powder with a nanometer particulate size (<50 nm) was mixed with a carbon powder.

COMPARATIVE EXAMPLE 3

A negative electrode was produced by the same procedure as in Example 1, except that the Sn powder with a nanometer particulate size (<50 nm) was used as a negative active material.

COMPARATIVE EXAMPLE 4

A negative electrode was produced by the same procedure as in Example 1, except that artificial graphite with an average particulate diameter of 20 μm was used as a negative active material.

Raman Spectroscopy

The Raman Spectroscopy was measured by the following procedure in order to identify crystallinity of carbon matrix as the negative active material according to Example 1.

Using an argon laser with a 514.5 nm frequency, peak areas were respectively measured at 1360 $cm^{-1}$ (D band, disorder) and 1580 $cm^{-1}$ (G band, order) under a condition of an exposed time of 60 seconds. The ratio of the peak area (D/G) was calculated. The results show that the core has a Raman Spectroscopy ratio of 0.2 or less, which indicates high crystallinity, and the carbon shell has a ratio of 0.2 to 1.5, which indicates semi-crystallinity. It is expected that if the heat-treatment is performed at low temperatures (2000° C. or less), the shell will have low crystallinity (1.5 or more).

SEM Photograph

Figure 3:
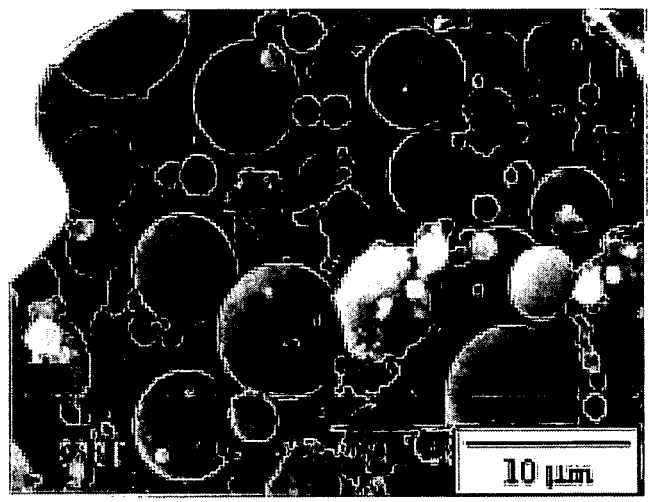
FIG. 3 is a SEM photograph of a negative active material of the present invention.

The SEM photograph of the negative active material, according to Example 1, is presented in FIG. 3. FIG. 3 shows that the metal particle was not attached on the outermost surface, and that a well-rounded negative active material was prepared.

X-Ray Diffraction Peak

Figure 4:
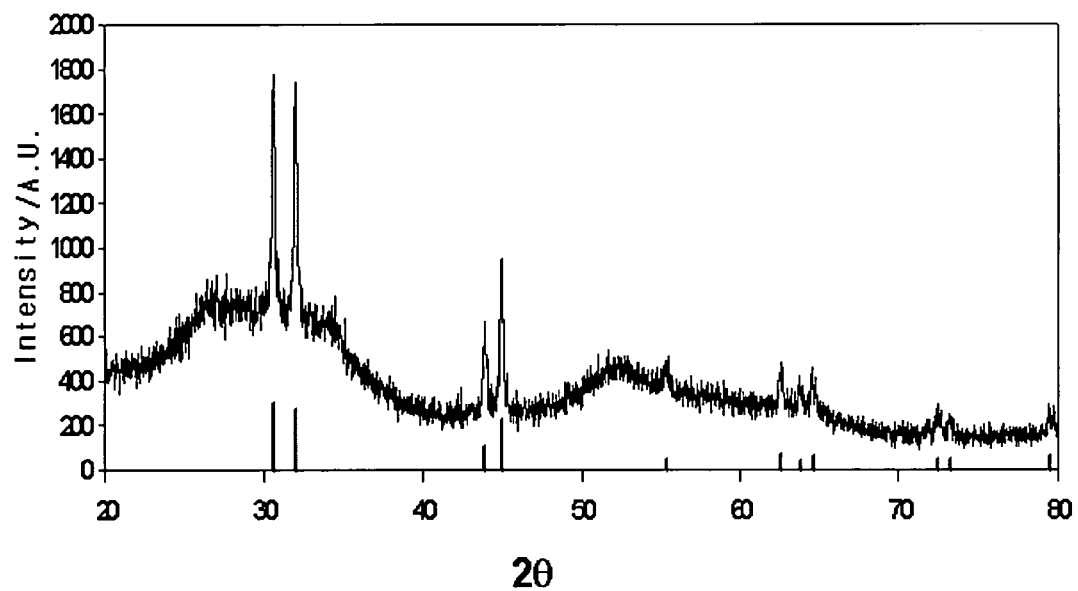
FIG. 4 is a graph showing an X-ray diffraction peak of a negative active material of the present invention.

The X-ray diffraction peak of the negative active material according to Example 1 is shown in FIG. 4. FIG. 4 shows that the negative active material according to Example 1 had a diffraction peak derived from Sn, as well as a diffraction peak derived from the amorphous carbonaceous material.

It is considered from FIGS. 3 and 4 that the negative active material according to Example 1 had Sn particles uniformly distributed in the carbon matrix.

Electrochemical Properties

Coin-type half-cells were fabricated by using the negative electrodes according to Examples 1 and 2, and Comparative Examples 1 to 4 and lithium metal foil counter electrodes. For the electrolyte, 1M $LiPF_6$ in a mixed solvent of ethylene carbonate and dimethoxyethane (1:1 volume ratio) was used.

The half-cell was charged at a cut off-voltage of 0V (vs. Li/Li+) and discharged at a cut off-voltage of 2.0V (vs. Li/Li+). The charge and discharge current density was set to 0.2C. The charge and discharge characteristics (e.g. discharge capacity, initial efficiency, reversible efficiency) were measured, and the results are summarized in Table 1.

TABLE 1

|  | Discharge capacity (mAh/g, 0.2 C.) | Amount of Sn (%) | Average diameter of Sn (μm) | Components shown in the diffraction peak | Initial efficiency (%, 1$^{st}$ cycle) | Reversible efficiency | Cycle life (%) |
| --- | --- | --- | --- | --- | --- | --- | --- |
| Example 1 | 455 | 15 | $5 \times 10^{-2}$ | Carbon, Sn | 92 | >99.5 | 90 |
| Example 2 | 450 | 15 | 10 | Carbon, Sn | 90 | >99.5 | 80 |
| Comparative Example 1 | 430 | 15 | $5 \times 10^{-2}$ | Carbon, Sn | 88 | ~96 | <30 |
| Comparative Example 2 | 360 | 15 | $5 \times 10^{-2}$ | Carbon, Sn | 65 | <90 | — |
| Comparative | 720 | 100 | $5 \times 10^{-2}$ | Sn | 73 | <90 | <10 |

TABLE 1-continued

| | Discharge capacity (mAh/g, 0.2 C.) | Amount of Sn (%) | Average diameter of Sn (μm) | Components shown in the diffraction peak | Initial efficiency (%, 1st cycle) | Reversible efficiency | Cycle life (%) |
|---|---|---|---|---|---|---|---|
| Example 3 Comparative Example 4 | 330 | 0 | — | Artificial graphite | 94 | >99.5 | 90 |

Table 1 shows that the cells according to Examples 1 and 2 exhibited surprisingly higher initial efficiency, reversible efficiency, and cycle life characteristics compared with those according to Comparative Examples 1 and 2. The cell according to Comparative Example 3 with the Sn negative active material exhibited a higher discharge capacity but a lower initial efficiency, reversible efficiency, and cycle life than those according to Examples 1 and 2. In addition, the cell according to Comparative Example 4 exhibited a lower discharge capacity than those according to Examples 1 and 2.

The negative active material of the present invention includes a carbon matrix, which provides a conductive pass for a metal and suppresses volume expansion of the metal. The negative active material exhibits good initial efficiency, reversible efficiency, and cycle life characteristics.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A negative active material for a rechargeable lithium battery comprising:
   particles of a carbonaceous material that are capable of reversibly intercalating and deintercalating lithium; and
   particles of a metal or a metal compound or mixtures thereof, distributed within the particles of carbonaceous material, wherein the particles of the metal or the metal compound have an average particulate diameter of 20 to 500 nm, the metal or the metal compound forming an alloy with lithium during electrochemical charging and discharging.

2. The negative active material of claim 1, wherein the metal or the metal compound is represented by formula 1:

$$A_{1-x}B_x \qquad (1)$$

where $0 \leq x \leq 0.\%$
   A is at least one selected from the group consisting of Sn, Si, Ag, Zn, Cd, Al, Ga, In, Ce, Pb, As, Bi, and Sb; and
   B is at least one selected from the group consisting of Zr, Ti, Fe, Co, Ni, Cu, C, O, N, and S.

3. The negative active material of claim 2, wherein x is in the range of 0 to 0.5.

4. The negative active material of claim 2, wherein the metal compound is an oxide of Sn, an oxide of Si, or an oxide of Sb.

5. The negative active material of claim 1, wherein the metal or the metal compound has an amorphous or a crystalline structure.

6. The negative active material of claim 1, wherein the particles of carbonaceous material having the particles of the metal or the metal compound or mixtures thereof distributed within have an average particulate diameter of 10 to 100 μm.

7. The negative active material of claim 6, wherein the particles of carbonaceous material havina the particles of the metal or the metal compound or mixtures thereof distributed within have an average particulate diameter of 20 to 50 μm.

8. The negative active material of claim 1, wherein the particles of the metal or the metal compound have an average particulate diameter of 20 to 80 nm.

9. The negative active material of claim 1, wherein the negative active material includes 10 to 80 wt % of the metal or the metal compound.

10. The negative active material of claim 1, wherein the ratio of the diameter of the particles of the metal or the metal compound to the diameter of the particles of carbonaceous material having the particles of the metal or the metal compound or mixtures thereof distributed therein have is 20 or less.

11. The negative active material of claim 1, wherein the negative active material includes an oxide layer formed on the metal or the metal compound.

12. The negative active material of claim 11, wherein the oxide layer has a thickness of 10 Å or less.

13. The negative active material of claim 1, wherein the particles of carbonaceous material having the particles of the metal or the metal compound or mixtures thereof distributed therein have a spherical shape or an elliptical shape.

14. The negative active material of claim 1, wherein the carbonaceous material is amorphous carbon.

15. The negative active material of claim 1, wherein the particles of carbonaceous material having the particles of the metal or the metal compound or mixtures thereof distributed therein have a core-shell structure, and the shell has a higher intensity ratio of Raman Spectroscopy peak intensity than the core.

16. The negative active material of claim 15, wherein the shell has an intensity ratio Ra I(1360)/1(1580) of a Raman Spectroscopy peak intensity I(1360) at a (1360) plane to an Raman Spectroscopy peak intensity I(1580) at a (1580) plane of 0.2 to 1.5.

17. A rechargeable lithium battery comprising:
   a positive electrode comprising a positive active material which reversibly intercalates and deintercalates lithium;
   a negative electrode including a negative active material;
   a separator interposed between the positive electrode and the negative electrode; and
   an electrolyte comprising a non-aqueous organic solvent and a lithium salt; and wherein the negative active material comprises:
      particles of a carbonaceous material that reversibly intercalate and deintercalate lithium, and
      a plurality of particles of a metal or a metal compound or mixtures thereof, distributed within the particles of the carbonaceous material, wherein the particles of the metal or the metal compound have an average particulate diameter of 20 to 500 nm, the metal or the metal compound being capable of forming an alloy with lithium during electrochemical charging and discharging.

18. The rechargeable lithium battery of claim 17, wherein the non-aqueous organic solvent is at least one selected from the group consisting of carbonates, esters, ethers, and ketones.

19. The rechargeable lithium battery of claim 17, wherein the metal or the metal compound is represented by formula 1:

$$A_{1-x}B_x \quad (1)$$

where $0 \leqq x \leqq 0.9$;
A is at least one selected from the group consisting of Sn, Si, Ag, Zn, Cd, Al, Ga, In, Ce, Pb, As, Bi, and Sb; and
B is at least one selected from the group consisting of Zr, Ti, Fe, Co, Ni, Cu, C, O, N, and S.

20. The rechargeable lithium battery of claim 19, wherein x is in the range of 0 to 0.5.

21. The rechargeable lithium battery of claim 19, wherein the metal compound is an oxide of Sn, an oxide of Si, or an oxide of Sb.

22. The rechargeable lithium battery of claim 17, wherein the metal or the metal compound has an amorphous or a crystalline structure.

23. The rechargeable lithium battery of claim 17, wherein the particles of carbonaceous material having the particles of the metal or the metal compound or mixtures thereof distributed within have an average particulate diameter of 10 to 100 μm.

24. The rechargeable lithium battery of claim 23, wherein the particles of carbonaceous material having the particles of the metal or the metal compound or mixtures thereof distributed within have an average particulate diameter of 20 to 50 μm.

25. The rechargeable lithium battery of claim 17, wherein the particles of the metal or the metal compound have an average particulate diameter of 20 to 80 nm.

26. The rechargeable lithium battery of claim 17, wherein the negative active material includes 10 to 80 wt % of the metal or the metal compound.

27. The rechargeable lithium battery of claim 17, wherein the ratio of the diameter of the particles of the metal or the metal compound to the diameter of the particles of carbonaceous material having the particles of the metal or the metal compound or mixtures thereof distributed within is 20 or less.

28. The rechargeable lithium battery of claim 17, wherein the negative active material includes an oxide layer formed on the metal or the metal compound.

29. The rechargeable lithium battery of claim 28, wherein the oxide layer has a thickness of 10 Å or less.

30. The rechargeable lithium battery of claim 17, wherein the particles of carbonaceous material having the particles of the metal or the metal compound or mixtures thereof distributed within have spherical shape or elliptical shape.

31. The rechargeable lithium battery of claim 17, wherein the carbonaceous material is amorphous carbon.

32. The rechargeable lithium battery of claim 17, wherein the particles of carbonaceous material having the particles of the metal or the metal compound or mixtures thereof distributed within have a core-shell structure, and the shell has a higher intensity ratio of Raman Spectroscopy peak intensity than the core.

33. The rechargeable lithium battery of claim 32, wherein the shell has an intensity ratio Ra I(1360)/I(1580) of a Raman Spectroscopy peak intensity I(1360) at a (1360) plane to an Raman Spectroscopy peak intensity I(1580) at a (1580) plane of 0.2 to 1.5.

* * * * *

UNITED STATES PATENT AND TRADEMARK OFFICE
CERTIFICATE OF CORRECTION

PATENT NO. : 7,452,632 B2 Page 1 of 1
APPLICATION NO. : 10/848168
DATED : November 18, 2008
INVENTOR(S) : Sang-Min Lee et al.

It is certified that error appears in the above-identified patent and that said Letters Patent is hereby corrected as shown below:

Column 9, line 49, change "0.%" to --0.9;--.

Signed and Sealed this

Sixth Day of January, 2009

JON W. DUDAS
*Director of the United States Patent and Trademark Office*